(12) United States Patent
Himmelmann

(10) Patent No.: US 11,668,204 B2
(45) Date of Patent: Jun. 6, 2023

(54) THERMALLY ISOLATING, MAGNETICALLY PRELOADED AND COUPLED THRUST BEARING AND RADIAL SUPPORT AND SHAFT ASSEMBLY

(71) Applicant: Hamilton Sundstrand Corporation, Charlotte, NC (US)

(72) Inventor: Richard A. Himmelmann, Beloit, WI (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 17/472,194

(22) Filed: Sep. 10, 2021

(65) Prior Publication Data
US 2023/0080255 A1  Mar. 16, 2023

(51) Int. Cl.
*F01D 15/10* (2006.01)
*F02C 7/36* (2006.01)

(52) U.S. Cl.
CPC .............. *F01D 15/10* (2013.01); *F02C 7/36* (2013.01); *F05D 2220/76* (2013.01)

(58) Field of Classification Search
CPC ......... F01D 15/10; F02C 7/36; F05D 2220/76
See application file for complete search history.

(56) References Cited

U.S. PATENT DOCUMENTS 3,666,064 A * 5/1972 Bird .................. F16D 27/01
  192/84.92
4,874,300 A   10/1989 Laing et al.
5,074,115 A   12/1991 Kawamura
5,497,615 A * 3/1996 Noe ........................ F02C 7/08
  60/39.511
5,863,179 A   1/1999 Westphal et al.
7,574,867 B2  8/2009 Teets et al.
(Continued)

FOREIGN PATENT DOCUMENTS

CN   104279225 A   1/2015
CN   208416974 U   1/2019
DE    19857999 A1   6/2000

OTHER PUBLICATIONS

European Search Report for Application No. 22189653.3, dated Feb. 10, 2023, 37 pages.

*Primary Examiner* — Shafiq Mian
(74) *Attorney, Agent, or Firm* — Cantor Colburn LLP

(57) ABSTRACT

An electrical power generation system including a micro-turbine alternator. The micro-turbine alternator including: a combustion chamber, at least one turbine driven by combustion gases from the combustion chamber, a first stage compressor, and a second stage compressor. The first stage compressor and the second stage compressor being operably connected to the combustion chamber to provide a compressed airflow thereto. The micro-turbine alternator including one or more shafts connecting the at least one turbine to the first stage compressor and the second stage compressor such that rotation of the at least one turbine drives rotation of the first stage compressor and second stage compressor. The one or more shafts include a turbine shaft attached to the at least one turbine a compressor shaft attached to the first stage compressor, and a coupling assembly configured to operably connect the turbine shaft to the compressor shaft via a magnetic coupling force.

18 Claims, 7 Drawing Sheets

(56) References Cited

U.S. PATENT DOCUMENTS

| | | | |
|---|---|---|---|
| 8,191,571 B2 | 6/2012 | Himmelmann et al. | |
| 9,074,609 B2* | 7/2015 | Zhang | F04D 29/584 |
| 10,641,123 B1* | 5/2020 | Narcus | B64D 27/24 |
| 2006/0017339 A1 | 1/2006 | Chordia et al. | |
| 2010/0212643 A1 | 8/2010 | Goedecke et al. | |
| 2012/0204574 A1* | 8/2012 | Zhang | F01D 5/081 |
| | | | 415/178 |
| 2020/0378302 A1* | 12/2020 | Teets | F02C 6/206 |
| 2021/0310422 A1* | 10/2021 | Johnson | F02C 7/04 |
| 2022/0063825 A1* | 3/2022 | Zatorski | B64D 33/00 |
| 2022/0154597 A1* | 5/2022 | Unton | F01D 25/04 |

* cited by examiner

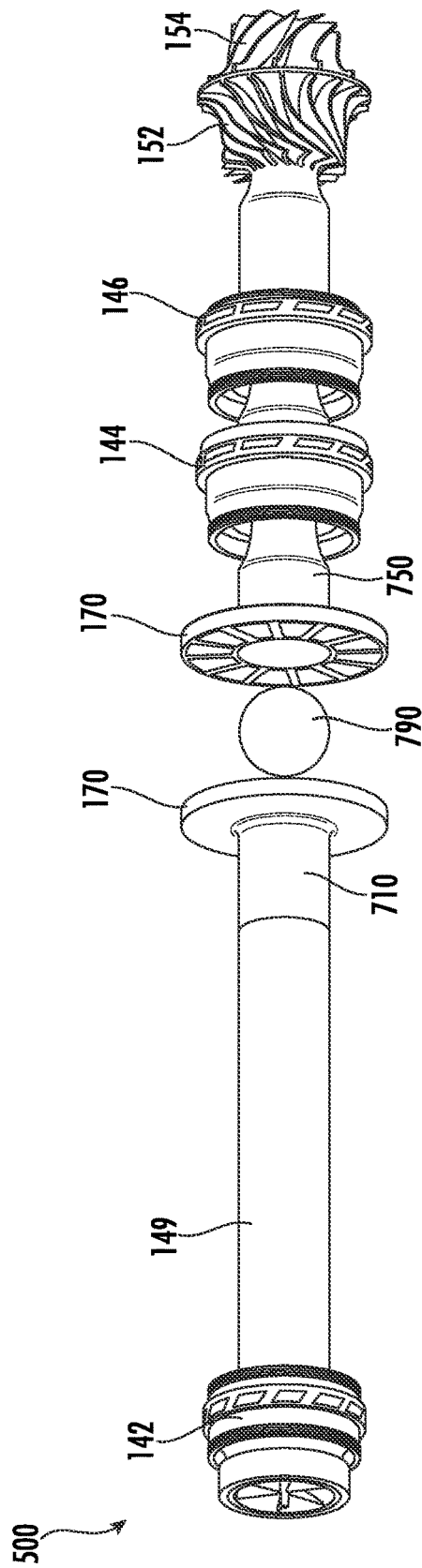
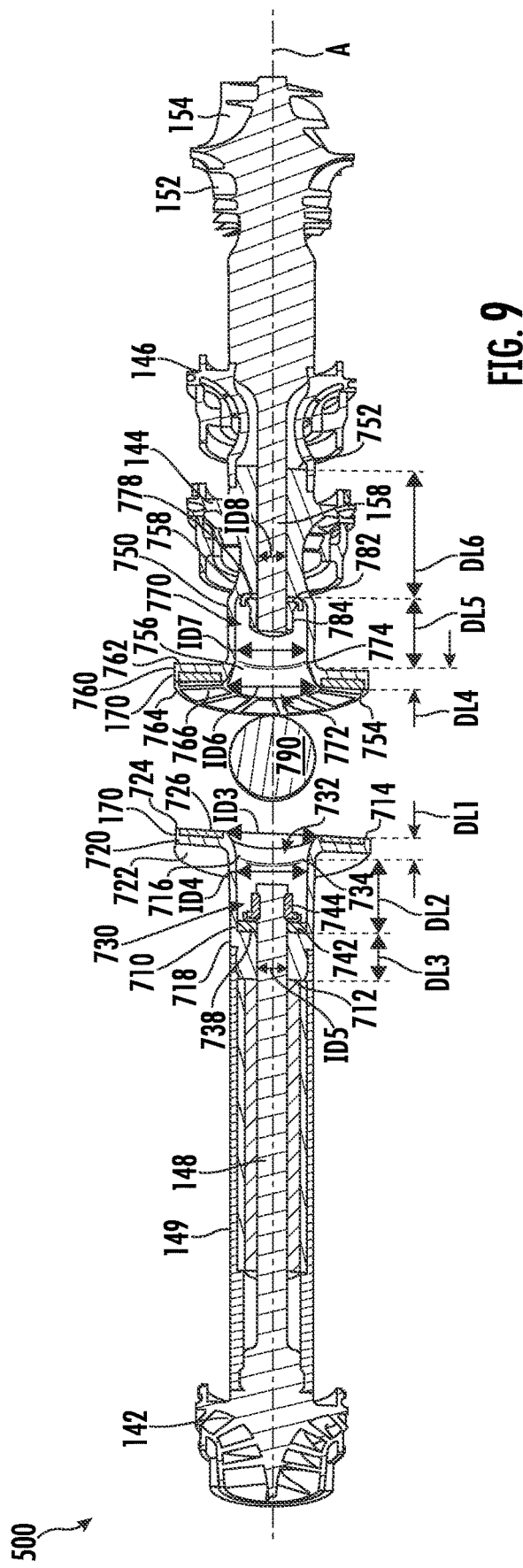
FIG. 8
FIG. 9

THERMALLY ISOLATING, MAGNETICALLY PRELOADED AND COUPLED THRUST BEARING AND RADIAL SUPPORT AND SHAFT ASSEMBLY

BACKGROUND

The embodiments herein generally relate to electrical power generation systems and more specifically, a magnetically coupled drive system for use in the electrical power generation system.

Some systems, such as unmanned aerial vehicles (UAV's) or the like often utilize electrical power for propulsion and operation of onboard systems. Some such systems, such as medium-sized UAV's that require power levels in the range of about 1 KW to 30 KW, have relatively short mission times because the energy density of batteries is far too low to effectively work in this power range, and conventional internal combustion engines and jet engines are very inefficient at these low power levels. One option that has been developed is a tethered UAV system in which the UAV is connected to a power source on the ground by a tether. Use of a tethered UAV allows for an increase in mission duration time, but reduces an operating height and distance in which the UAV may operate, due to the constraint of the tether. An untethered efficient power source that is lightweight with a high power density is greatly desired.

BRIEF SUMMARY

According to one embodiment, an electrical power generation system is provided. The electrical power generation system including a micro-turbine alternator. The micro-turbine alternator including: a combustion chamber, at least one turbine driven by combustion gases from the combustion chamber, a first stage compressor, and a second stage compressor located aft of the first stage compressor. The first stage compressor and the second stage compressor being operably connected to the combustion chamber to provide a compressed airflow thereto. The micro-turbine alternator including one or more shafts connecting the at least one turbine to the first stage compressor and the second stage compressor such that rotation of the at least one turbine drives rotation of the first stage compressor and second stage compressor. The one or more shafts include a turbine shaft attached to the at least one turbine a compressor shaft attached to the first stage compressor, and a coupling assembly configured to operably connect the turbine shaft to the compressor shaft via a magnetic coupling force.

In addition to one or more of the features described above, or as an alternative, further embodiments may include that the coupling assembly further includes a generator coupler secured to the compressor shaft. The generator coupler includes a first plurality of magnets having a first magnetic polarity. The coupling assembly includes a turbine coupler secured to the turbine shaft. The turbine coupler includes a second plurality of magnets having a second magnetic polarity opposite the first magnetic polarity. The magnetic coupling force between the first plurality of magnets and the second plurality of magnets provides an axial clamping force that pulls the turbine coupler toward the generator coupler.

In addition to one or more of the features described above, or as an alternative, further embodiments may include that the coupling assembly further includes a spherical bearing located between the generator coupler and the turbine coupler.

In addition to one or more of the features described above, or as an alternative, further embodiments may include that the generator coupler further includes a first conical opening configured to cradle a first portion of the spherical bearing. The turbine coupler further includes a second conical opening configured to cradle a second portion of the spherical bearing.

In addition to one or more of the features described above, or as an alternative, further embodiments may include that the generator coupler further includes a first spherical opening configured to cradle a first portion of the spherical bearing. The turbine coupler includes a second spherical opening configured to cradle a second portion of the spherical bearing.

In addition to one or more of the features described above, or as an alternative, further embodiments may include that the generator coupler further includes a first generator coupler end, a second generator coupler end located opposite the first generator coupler end, and a generator coupler passage extending from the first generator coupler end to the second generator coupler end.

In addition to one or more of the features described above, or as an alternative, further embodiments may include that the generator coupler further includes an inner generator coupler surface defining the generator coupler passage. The inner generator coupler surface includes a first conical opening located at the second generator coupler end and extending to a first conical base located a first distance away from the second generator coupler end. The first conical opening configured to cradle a first portion of the spherical bearing. The generator coupler surface includes a generator coupler seat located between the first conical base and the first generator coupler end. The inner generator coupler surface at the generator coupler seat is about perpendicular to the inner generator coupler surface from the generator coupler seat to the first generator coupler end.

In addition to one or more of the features described above, or as an alternative, further embodiments may include that the generator coupler further includes a first nut threaded onto and secured to the compressor shaft within the generator coupler passage and a first washer interposed between the first nut and the generator coupler seat. The generator coupler is secured to the compressor shaft via the first nut and the generator coupler seat.

In addition to one or more of the features described above, or as an alternative, further embodiments may include that the generator coupler further includes a generator coupling disc located at the second generator coupler end. The generator coupling disc includes a generator facing surface and a turbine coupler facing surface located opposite the generator facing surface. The first plurality of magnets are attached to or embedded in the generator coupling disc.

In addition to one or more of the features described above, or as an alternative, further embodiments may include that the first plurality of magnets are attached to or embedded in the turbine coupler facing surface.

In addition to one or more of the features described above, or as an alternative, further embodiments may include that the first plurality of magnets are arrayed in a ring shape around at least one of the turbine coupler facing surface or a central longitudinal axis A of the electrical power generation system.

In addition to one or more of the features described above, or as an alternative, further embodiments may include that the turbine coupler further includes a first turbine coupler end, a second turbine coupler end located opposite the first turbine coupler end, and a turbine coupler passage extending from the first turbine coupler end to the second turbine coupler end.

In addition to one or more of the features described above, or as an alternative, further embodiments may include that the turbine coupler further includes an inner turbine coupler surface defining the turbine coupler passage. The inner turbine coupler surface includes a second conical opening located at the second turbine coupler end and extending to a second conical base located a first distance away from the second turbine coupler end. The second conical opening configured to cradle a second portion of the spherical bearing. The inner turbine coupler surface includes a turbine coupler seat located between the second conical base and the first turbine coupler end. The inner turbine coupler surface at the turbine coupler seat is about perpendicular to the inner turbine coupler surface from the turbine coupler seat to the first turbine coupler end.

In addition to one or more of the features described above, or as an alternative, further embodiments may include that the turbine coupler further includes a second nut threaded onto and secured to the turbine shaft within the turbine coupler passage and a second washer interposed between the second nut and the turbine coupler seat. The turbine coupler is secured to the turbine shaft via the second nut and the turbine coupler seat.

In addition to one or more of the features described above, or as an alternative, further embodiments may include that the turbine coupler further includes a turbine coupling disc located at the second turbine coupler end. The turbine coupling disc includes a turbine facing surface and a generator coupler facing surface located opposite the turbine facing surface. The second plurality of magnets are attached to or embedded in the turbine coupling disc.

In addition to one or more of the features described above, or as an alternative, further embodiments may include that the second plurality of magnets are attached to or embedded in the generator coupler facing surface.

In addition to one or more of the features described above, or as an alternative, further embodiments may include that the second plurality of magnets are arrayed in a ring shape around at least one of the generator coupler facing surface or a central longitudinal axis A of the electrical power generation system.

In addition to one or more of the features described above, or as an alternative, further embodiments may include an electric generator disposed along the one or more shafts such that electrical power is generated via rotation of the one or more shafts. The electric generator is disposed along the one or more shafts between the first stage compressor and the second stage compressor.

In addition to one or more of the features described above, or as an alternative, further embodiments may include that at least one of the one or more shafts passes through the electric generator.

According to another embodiment, a vehicle is provided. The vehicle including a propulsion system and an electrical power generation system operably connected to the propulsion system. The electrical power generation system includes a micro-turbine alternator. The micro-turbine alternator including: a combustion chamber, at least one turbine driven by combustion gases from the combustion chamber, a first stage compressor, and a second stage compressor located aft of the first stage compressor. The first stage compressor and the second stage compressor being operably connected to the combustion chamber to provide a compressed airflow thereto. The micro-turbine alternator including one or more shafts connecting the at least one turbine to the first stage compressor and the second stage compressor such that rotation of the at least one turbine drives rotation of the first stage compressor and second stage compressor. The one or more shafts include a turbine shaft attached to the at least one turbine a compressor shaft attached to the first stage compressor, and a coupling assembly configured to operably connect the turbine shaft to the compressor shaft via a magnetic coupling force.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The following descriptions should not be considered limiting in any way. With reference to the accompanying drawings, like elements are numbered alike:

FIG. 8 is an enlarged isometric view of the drive line assembly of the micro-turbine alternator, according to an embodiment of the present disclosure;

FIG. 9 is an enlarged isometric cut-away view of the drive line assembly of the micro-turbine alternator, according to an embodiment of the present disclosure.

DETAILED DESCRIPTION

A detailed description of one or more embodiments of the disclosed apparatus and method are presented herein by way of exemplification and not limitation with reference to the Figures.

As previously noted, an untethered, lightweight, high power density power source would allow systems like UAVs to have longer mission times without the height and distance limits of a tether. A prior approach to power generation involves micro-turbine alternator designs that places the electric generator at a forward end of a rotating shaft upstream of the compressor and turbine, which are then both located at an aft end of a rotating shaft. With this type of arrangement, the rotational speed of the compressor is limited by the compressor inlet relative velocity as the inlet diameter of the compress hub is increased to accommodate the rotating shaft that connects the compressor hub to the electric generator. Further, with this type of arrangement the compressor and turbine are overhung on the aft end of the rotating shaft, thus reducing the critical speed of the overall assembly. Embodiments disclosed herein relate to an inter-stage electric alternator for micro-turbine alternator applications. The micro-turbine alternator according to one or more embodiments may be used in a UAV or electrically-powered suit, as discussed for explanatory purposes, or any electrically-powered system. The design places an electric generator between two stages of the compressor to reduce the inlet diameter of the first stage compressor hub to as close to zero as possible so that the micro-turbine alternator may provide more power and operate with a lower inlet pressure.

Placing the electric generator in the compressor section creates some complications regarding heat transfer between the turbine section and the electric generator located in the compressor section. To avoid demagnetization of the permanent magnets of the electric generator, the electric generator should be kept cooler and thermally separated as best as possible from the turbine section, which runs hotter than the compressor section. The embodiments disclosed herein relate to a coupling assembly configured to thermally separate the turbine section from the compressor section while simultaneously transferring torque from the turbine section to the compressor section.

Figure 1:
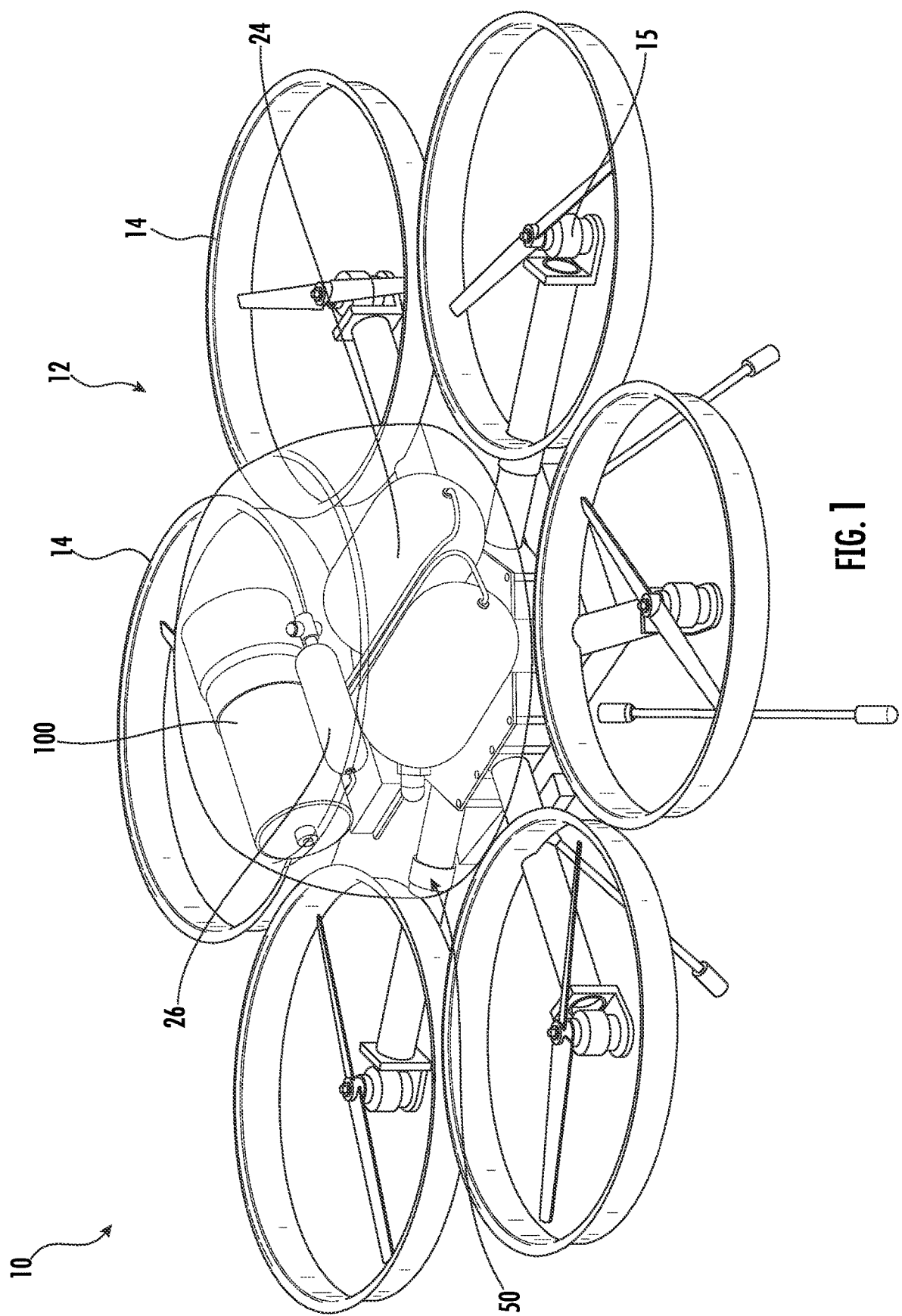
FIG. 1 is an isometric view of an unmanned aerial vehicle including a power generation system, according to an embodiment of the present disclosure.

Referring to FIG. 1, an isometric view of an unmanned aerial vehicle (UAV) 10 is illustrated in accordance with an embodiment of the present disclosure. The UAV 10 includes a propulsion/lift system 12, for example a plurality of lift rotors 14, operably connected to an electrical power generation system 50, which includes a micro-turbine alternator system 100. In an embodiment, the micro-turbine alternator system 100 is a high efficiency Brayton cycle micro-turbine alternator. The UAV 10 includes a propulsion system having electric motors 15 and lift rotors 14 associated with each electric motor 15. Each lift rotor 14 is operably connected to the electric motor 15 that is configured to rotate the lift rotor 14 using electrical power generated by the micro-turbine alternator system 100 of the electrical power generation system 50. The micro-turbine alternator system 100 is configured to convert fuel to electrical power to power at least the electric motors 15 of the lift rotors 14. The fuel is provided from one or more fuel storage tanks 24 operably connected to the micro-turbine alternator system 100. In some embodiments, the fuel utilized is JP-8. The micro-turbine alternator system 100 may utilize compressed air provided from a compressed air tank 26 at 4500 psig and regulated to about 750 psig. The compressed air from the compressed air tank 26 of FIG. 1 may be utilized to provide the motive pressure required to drive the liquid fuel through a turbine speed control valve (not shown) and into a combustion chamber. Alternatively, an electric driven pump may be used in place of the compressed air.

Figure 2:
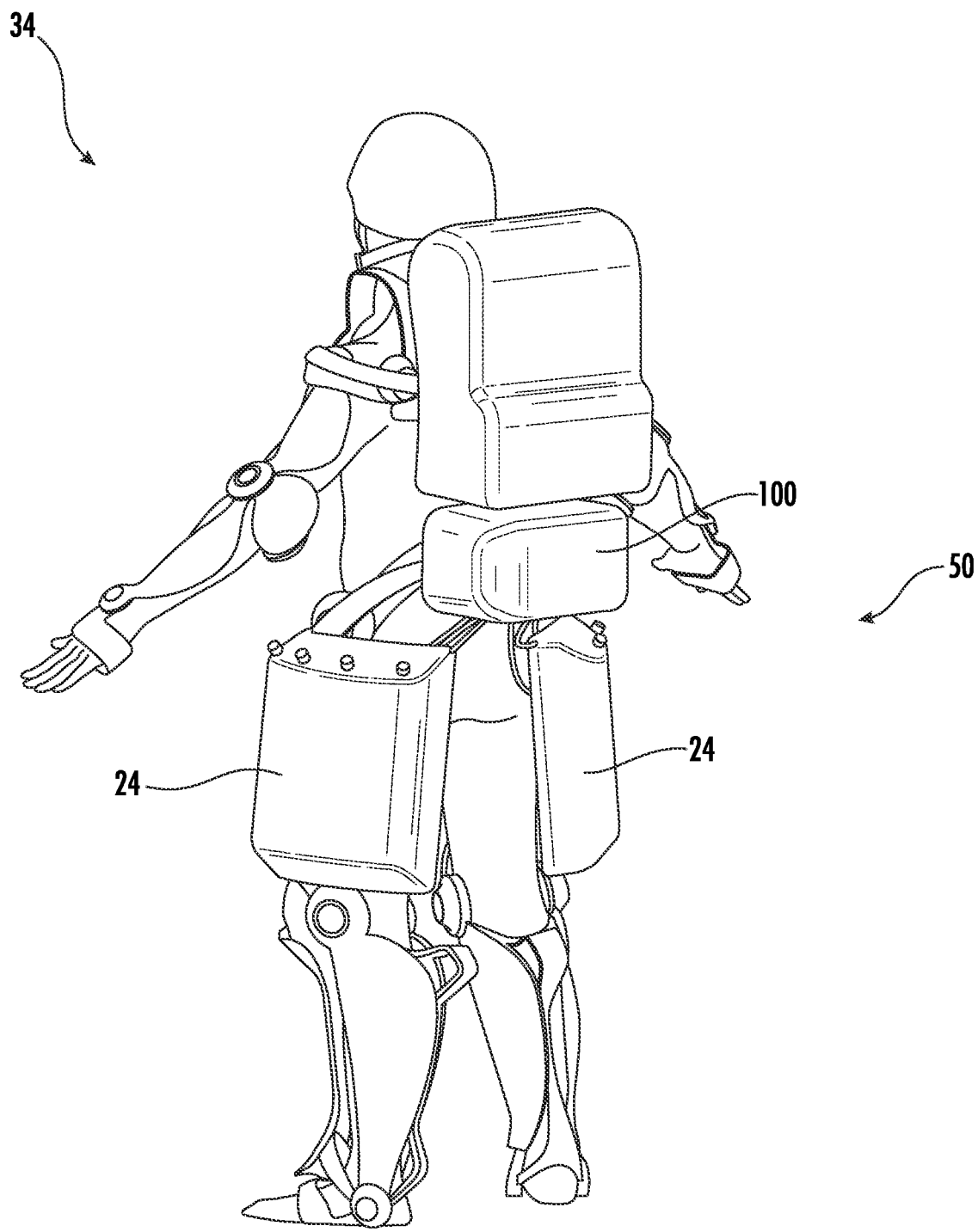
FIG. 2 is an isometric view of a powered suit including a power generation system, according to an embodiment of the present disclosure.

Referring now to FIG. 2, with continued reference to FIG. 1, an isometric view of an electrically-powered suit 34 is illustrated in accordance with an embodiment of the present disclosure. While in FIG. 1, the micro-turbine alternator system 100 is described as utilized in a UAV 10, the micro-turbine alternator system 100 disclosed herein may be readily applied to other systems, and may be utilized in, for example, an electrically-powered suit 34, as shown in FIG. 2.

The electrically-powered suit 34 is operably connected to an electrical power generation system 50, which includes a micro-turbine alternator system 100. The micro-turbine alternator system 100 is configured to convert fuel to electrical power to power the electrically-powered suit 34. The fuel is provided from one or more fuel storage tanks 24 operably connected to the micro-turbine alternator system 100. In some embodiments, the fuel utilized is JP-8. The fuel storage tanks 24 may be located on legs of the electrically-powered suit 34, as illustrated in FIG. 2.

It is understood that the micro-turbine alternator system 100 is not limited to a UAV 10 and an electrically-powered suit 34 application, and the micro-turbine alternator system 100 may be applied to other systems not disclosed herein.

Figure 3:
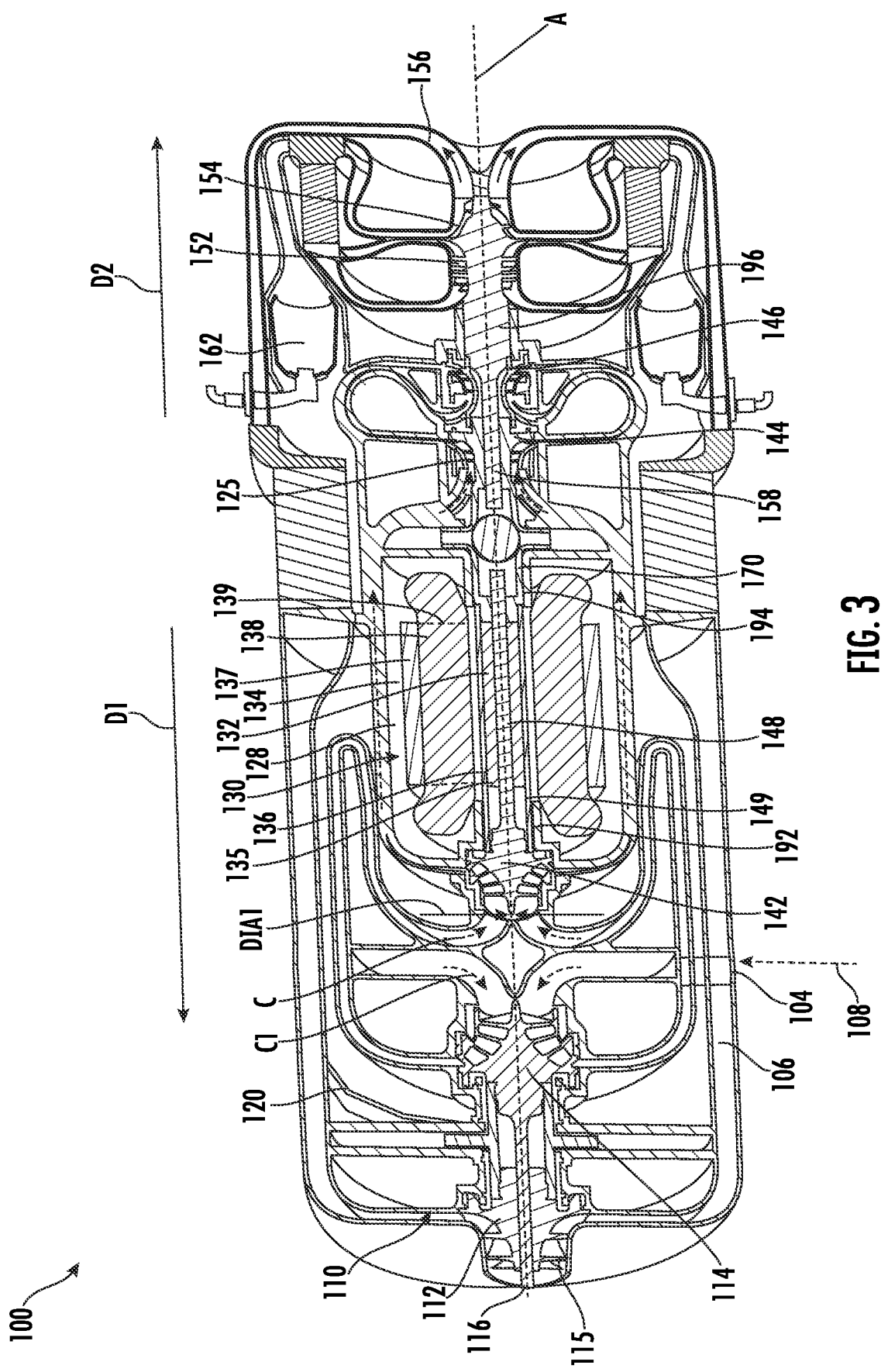
FIG. 3 is an isometric cut-away view of a micro-turbine alternator for use in the power generation system of FIGS. 1 and 2, according to an embodiment of the present disclosure.

Referring now to FIG. 3, an isometric cut-away view of the micro-turbine alternator system 100 is illustrated, in accordance with an embodiment of the present disclosure. The micro-turbine alternator system 100 includes a first stage compressor 142, a second stage compressor 144, a third stage compressor 146, a first stage turbine 152, and a second stage turbine 154. The first stage compressor 142, the second stage compressor 144, the third stage compressor 146, the first stage turbine 152, and the second stage turbine 154 are oriented along a central longitudinal axis A of the micro-turbine alternator system 100. The micro-turbine alternator system 100 also includes an electric generator 130 located between the first stage compressor 142 and the second stage compressor 144 as measured along the central longitudinal axis A.

Advantageously, by locating the electric generator 130 between the first stage compressor 142 and the second stage compressor 144, the overall physical size of the micro-turbine alternator system 100 is reduced. As a result, the micro-turbine alternator system 100 according to one or more embodiments may be used in a UAV 10, an electrically-powered suit 34, or another system that benefits from untethered, lightweight power generation.

The micro-turbine alternator system 100 also includes an alternator stator cooling heat exchanger 128 configured to utilize airflow from the first stage compressor 142 to cool the electric generator 130. The alternator stator cooling heat exchanger 128 may encircle or enclose the electric generator 130 and may be configured to pass airflow from the first stage compressor 142 through or around the electric generator 130. Advantageously, by locating the electric generator 130 between the first stage compressor 142 and the second stage compressor 144, moderately cool air in the core flow path C from the first stage compressor 142 is forced through the alternator stator cooling heat exchanger 128 and heat may be drawn out of the electric generator 130 and to the airflow within the alternator stator cooling heat exchanger 128.

The electric generator 130 may be a permanent magnet alternator, an induction generator, a switched reluctance generator, a wound field generator, a hybrid generator, or any other type of alternator known to one of skill in the art. As illustrated in FIG. 3, the electric generator 130 may be a permanent magnet alternator that includes a rotor element 132 and a stator element 134 radially outward from the rotor element. In other words, the rotor element 132 is located radially inward from the stator element 134 as measured relative to the central longitudinal axis A. It is understood that the embodiments disclosed herein may be applicable to a rotor element 132 that is located radially outward from the stator element 134. The rotor element 132 may be rotated around the central longitudinal axis A to generate electricity.

The rotor element 132 includes an annular base member 135, an annular array of permanent magnets 136 that are respectively coupled to an outer diameter of the annular base member 135. The rotor element 132 may include a magnet retention band that fits over an outer diameter of the permanent magnet 136, and keeps the permanent magnet 136 on the rotating annular base member 135. In accordance with further embodiments, the stator element 134 includes a hub 137, a plurality of spokes 139 extending radially inward from the hub 137 and conductive elements 138 that are wound around the spokes 139 to form windings. When the rotor element 132 is rotated around the central longitudinal axis A a rotating flux field is generated by the permanent magnets 136 and this rotating flux field generates an alternating current in the conductive elements 138 to generate electricity for use by the UAV 10 of FIG. 1 or the electrically-powered suit 34 of FIG. 2.

The micro-turbine alternator system 100 includes a combustion chamber 162, in which a fuel-air mixture is combusted, with the combustion products utilized to drive an electric generator 130. In some embodiments, the fuel utilized in the combustion chamber 162 is JP-8. The micro-turbine alternator system 100 converts the energy of the combustion products into electrical power by urging the combustion products through the first stage turbine 152 and the second stage turbine 154, which are operably connected to and configured to rotate the rotor element 132 of the electric generator 130. The electrical energy generated by the electric generator 130 may then be rectified via a generator rectifier (not shown) and utilized by the propulsion/lift system 12 of FIG. 1 or the electrically-powered suit 34 of FIG. 2. The compressed air from the compressed air tank 26 of FIG. 1 may be utilized to provide the motive pressure required to drive the liquid fuel through a turbine speed control valve (not shown) and into the combustion chamber 162.

The first stage compressor 142 is located forward of the second stage compressor 144 and the third stage compressor 146 as measured along the central longitudinal axis A, and the second stage compressor 144 is located forward of the third stage compressor 146 as measured along the central longitudinal axis A. In other words, the second stage compressor 144 is located aft of the first stage compressor 142 and the third stage compressor 146 is located aft of the second stage compressor 144 as measured along the central longitudinal axis A. The forward direction D1 and the aft direction D2 are illustrated in FIG. 3. The first stage turbine 152 is located forward of the second stage turbine 154 as measured along the central longitudinal axis A. In other words, the second stage turbine 154 is located aft of the first stage turbine 152 as measured along the central longitudinal axis A. The first stage compressor 142, the second stage compressor 144, and the third stage compressor 146 are located forward of first stage turbine 152 and the second stage turbine 154 as measured along the central longitudinal axis A.

The micro-turbine alternator system 100 includes a compressor shaft 148 oriented along and co-axial to the central longitudinal axis A. In an embodiment, the compressor shaft 148 is a tie bolt and is used to compress a rotating group of components including the first stage compressor 142, compressor transfer tube 149, the compressor shaft 148, and a second journal bearing 194 in the axial direction, causing the multi-segment shaft to act as a single stiff shaft. The compressor shaft 148 may be attached or operably connected to the first stage compressor 142. The micro-turbine alternator system 100 includes a turbine shaft 158 oriented along and co-axial to the central longitudinal axis A. The turbine shaft 158 may be attached or operably connected to the first stage turbine 152 and the second stage turbine 154.

The micro-turbine alternator system 100 includes a coupling assembly 170 configured to operably connect the turbine shaft 158 to the compressor shaft 148. The coupling assembly 170 may be attached or operably connected to the second stage compressor 144. The compressor shaft 148 extends in the aft direction D2 away from the first stage compressor 142 and through the electric generator 130 to operably connect to the coupling assembly 170. In an embodiment, the compressor shaft 148 is located radially inward of the rotor element 132.

Advantageously, locating the electric generator 130 between the first stage compressor 142 and the second stage compressor 144 allows the first stage compressor 142 to have a reduced inlet hub diameter that is smaller than a diameter of the rotor element 132. Having a reduced inlet hub diameter DIA1 reduces the inlet flow relative velocity, increasing the aerodynamic performance of the first stage compressor 142 and increasing the swallowing capacity of the first stage compressor 142. If the electric generator 130 was located forward of the first stage compressor 142, then the compressor shaft 148 would have to extend forward of the first stage compressor 142 and thus the inlet hub diameter DIA1 would have to be increased to a diameter of the compressor shaft 148, thus decreasing the aerodynamic performance of the first stage compressor 142 and decreasing the swallowing capacity of the first stage compressor 142.

The turbine shaft 158 extends in the forward direction D1 away from the first stage turbine 152 to operably connect to the coupling assembly 170. The turbine shaft 158, the coupling assembly 170, and the compressor shaft 148 are configured to rotate in unison. Thus, when exhaust 102 from the combustion chamber 162 drives rotation of the first stage turbine 152 and the second stage turbine 154, the rotation of the first stage turbine 152 and the second stage turbine 154 drives rotation of the turbine shaft 158, which drives rotation of the coupling assembly 170 and the compressor shaft 148. The rotation of the compressor shaft 148 drives rotation of the first stage compressor 142. The rotation of the coupling assembly 170 drives rotation of the second stage compressor 144. The third stage compressor 146 is operably connected to the second stage compressor 144 and the turbine shaft 158, and thus rotation of the second stage compressor 144 and the turbine shaft 158 drives rotation of the third stage compressor 146.

It is understood that while the compressor shaft 148, the turbine shaft 158, and the coupling assembly 170 are described as three different shafts, the embodiments disclosed herein may be applicable to micro-turbine alternator system 100 having one or more shafts. In an embodiment, the electric generator 130 is disposed along the one or more shafts between the first stage compressor 142 and the second stage compressor 144. In another embodiment, the electric generator 130 is disposed along the compressor shaft 148 between the first stage compressor 142 and the second stage compressor 144. The electric generator 130 is located aft of the first stage compressor 142 and forward of the second stage compressor 144. In another embodiment, at least one of the one or more drive shafts passes through the electric generator 130. In another embodiment, the compressor shaft 148 passes through the electric generator 130.

The compressor shaft 148, the turbine shaft 158, and the coupling assembly 170 are coaxial and rotate via the bearing systems about the central longitudinal axis A, which is colinear with their longitudinal axes. The bearing system includes a first journal bearing 192 located between the compressor transfer tube 149 and the frame 106 of the micro-turbine alternator system 100. The bearing system includes a second journal bearing 194 located between the coupling assembly 170 and the frame 106 of the micro-turbine alternator system 100. The bearing system includes a third journal bearing 196 located between the turbine shaft 158 and the frame 106 of the micro-turbine alternator system 100.

Advantageously, locating the electric generator 130 between the first stage compressor 142 and the second stage compressor 144 provides for very effective bearing placement around the compressor shaft 148, which increases the stiffness of the compressor shaft 148. The increased stiffness of the compressor shaft 148 allows for an increase in the critical speed of the compressor shaft 148.

Also, advantageously, by locating the electric generator 130 between the first stage compressor 142 and the second stage compressor 144, the alternator stator cooling heat exchanger 128 helps reduce the operating temperature of the electric generator 130, while the airflow through the alternator stator cooling heat exchanger 128 also experiences a pressure drop. This pressure drop through the alternator stator cooling heat exchanger 128 forces some of the airflow from the first stage compressor 142 through the rotor element 132 and to a stator gap between the rotor element 132 and the stator element 134, which provides cooling air to the rotor element 132, the first journal bearing 192, and the second journal bearing 194.

The compressor transfer tube 149 extends from the first stage compressor 142 to the second stage compressor 144 through the electric generator 130. The compressor transfer tube 149 is co-axial with the electric generator 130. The rotor element 132 with the annular base member 135 and the annular array of permanent magnets 136 are located radially inward of the compressor transfer tube 149 measured relative to the central longitudinal axis A. The stator element 134 with the hub 137, the conductive elements 138, and the spokes 139 are located radially outward of the compressor transfer tube 149 measured relative to the central longitudinal axis A.

The first stage compressor 142, the second stage compressor 144, and the third stage compressor 146 drive air along a core flow path C for compression and communication in the combustion chamber 162. The airflow in the core flow path C is compressed by the first stage compressor 142, the second stage compressor 144, and the third stage compressor 146, is mixed with fuel and burned in the combustion chamber 162, and is then expanded over the first stage turbine 152 and the second stage turbine 154. The first stage turbine 152 and the second stage turbine 154 rotationally drive the turbine shaft 158 in response to the expansion. The combustion products are exhausted from the second stage turbine 154 through a turbine exit 156.

Each of the first stage compressor 142, the second stage compressor 144, the third stage compressor 146, the first stage turbine 152, and the second stage turbine 154 may include rows of rotor assemblies (shown schematically) that carry airfoils that extend into the core flow path C. For example, the rotor assemblies can carry a plurality of rotating blades 125. The blades 125 of the rotor assemblies create or extract energy (in the form of pressure) from the core airflow that is communicated through the micro-turbine alternator system 100 along the core flow path C.

The micro-turbine alternator system 100 may include an auxiliary turbo charger 110 to pre-compress the airflow 108 prior to entering the core flow path C. The auxiliary turbo charger 110 includes a turbo compressor 114 and a turbine 112 operably connected to the turbo compressor 114 through a turbo compressor drive shaft 116. The turbo compressor 114 is configured to rotate when the turbine 112 rotates.

The turbo compressor 114 is configured to pull external airflow 108 through one or more air inlets 104 in the frame 106 into a compressor flow path C1. The turbo compressor 114 is configured to compress the external airflow 108 in the compressor flow path C1 and deliver the airflow 108 to the first stage compressor 142 in the core airflow path C.

Each of the turbine 112 and the turbo compressor 114 may include rows of rotor assemblies (shown schematically) that carry airfoils that extend into the compressor flow path C1. For example, the rotor assemblies can carry a plurality of rotating blades 115. The blades 115 of the rotor assemblies for the turbine 112 extract energy (in the form of pressure and temperature) from the exhaust 102 that is communicated through the micro-turbine alternator system 100 along the core flow path C. The blades 115 of the rotor assemblies for the turbo compressor 114 create energy (in the form of pressure and temperature) from the airflow 108 that is communicated through the micro-turbine alternator system 100 along the compressor flow path C1.

Combustor exhaust 102 exiting the turbine exit 156 is directed to the turbine 112 of the auxiliary turbo charger 110. The exhaust 102 is then expanded over the turbine 112 of the auxiliary turbo charger 110. The turbine 112 rotationally drives the turbo compressor drive shaft 116 in response to the expansion. Rotation of the turbo compressor drive shaft 116 causes the turbo compressor 114 to rotate and compress the airflow 108 within the compressor flow path C1.

Some embodiments further include a thermal electric energy recovery system 120, configured to recover additional energy from exhaust 102 of the micro-turbine alternator system 100 before the exhaust 102 has flowed through the turbine 112 of the auxiliary turbo charger 110.

Figure 5:
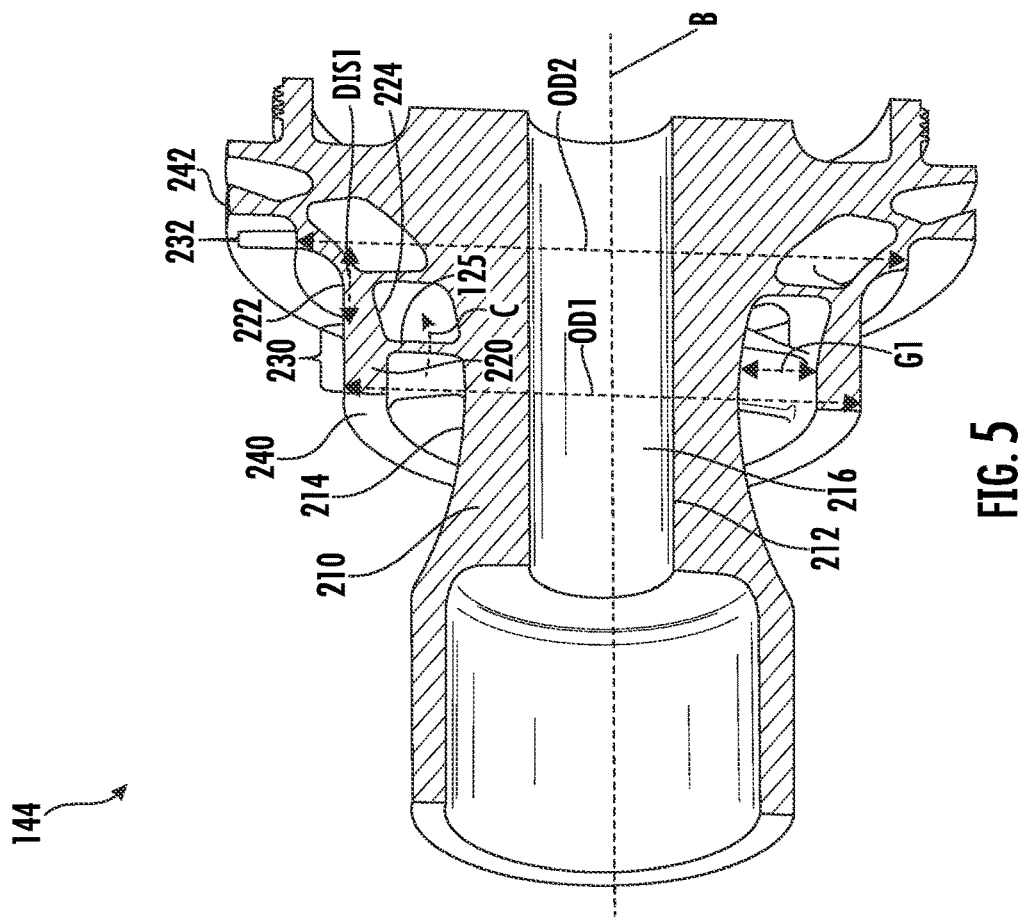
FIG. 5 is an isometric cutaway view of the second stage compressor of the micro-turbine alternator, according to an embodiment of the present disclosure.
Figure 4:
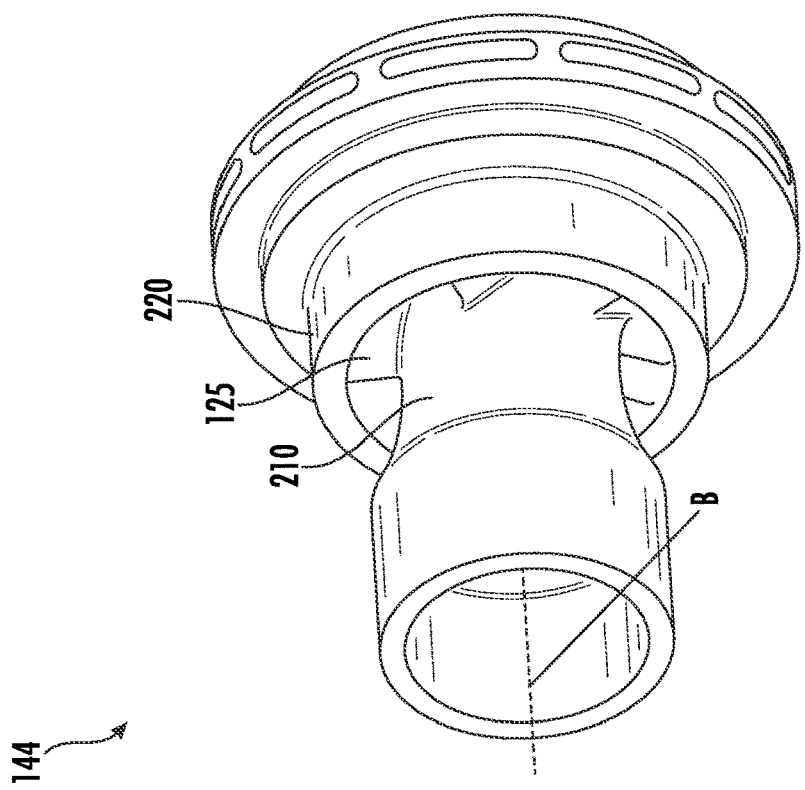
FIG. 4 is an isometric view of a second stage compressor of the micro-turbine alternator, according to an embodiment of the present disclosure.

Referring now to FIGS. 4 and 5, with continued reference to FIGS. 1-3, an isometric view of the second stage compressor 144 is illustrated in FIG. 4 and an isometric cutaway view of the second stage compressor 144 is illustrated in FIG. 5, in accordance with an embodiment of the present disclosure. It is understood that while FIGS. 4 and 5 and the associated description discuss the embodiments disclosed in relation with the second stage compressor 144, the embodiments disclosed herein are not limited to the second stage compressor 144 and may be applicable to other compressors within the micro-turbine alternator system 100 or any other system where compressors or pumps are required.

The second stage compressor 144 includes central shaft 210. The central shaft 210 is coaxial to a compressor longitudinal axis B. The central shaft 210 rotates about the compressor longitudinal axis B. When the second stage compressor 144 is installed within the micro-turbine alternator system 100 of FIG. 3, the compressor longitudinal axis B is colinear with the central longitudinal axis A. In other words, the compressor longitudinal axis B and the central longitudinal axis A are the same axis when the second stage compressor 144 is installed within the micro-turbine alternator system 100 of FIG. 3.

The central shaft 210 includes an external surface 214 and an internal surface 216. The central shaft 210 includes a passageway 212 formed therein. The internal surface 216 defines the passageway 212. The passageway 212 is coaxial with the compressor longitudinal axis B. The passageway 212 may be tubular in shape and configured to fit the turbine shaft 158 (See FIG. 3). In other words, the turbine shaft 158 is configured to fit within the passageway 212.

The second stage compressor 144 includes a shroud 220 extending circumferentially around the central shaft 210. The shroud 220 is separated from the central shaft 210 by a gap G1. The gap G1 extends circumferentially around the compressor longitudinal axis B and may vary in size moving from a forward end 240 of the shroud 220 to an aft end 242 of the shroud 220. The shroud 220 encircles the central shaft 210. The shroud 220 includes a radially outward surface 222 and a radially inward surface 224 located opposite the radially outward surface 222. The core flow path C is defined between the external surface 214 of the central shaft 210 and the radially inward surface 224 of the shroud 220. In other words, the external surface 214 of the central shaft 210 and the radially inward surface 224 of the shroud 220 are in a facing spaced relationship forming the core flow path C therebetween.

The radially outward surface 222 of the shroud 220 may have a first outer diameter OD1 along a first portion 230 of the shroud 220. Alternatively, the first outer diameter OD1 may be slightly raised in the first portion 230 with an undercut aft of the first portion 230 in the radially outward surface 22. The undercut may facilitate grinding operations. The first portion 230 may be located at the forward end 240 of the shroud 220. The radially outward surface 222 of the shroud 220 may have a second outer diameter OD2 along a second portion 232 of the shroud 220. The second outer diameter OD2 is greater than the first outer diameter OD1. The second portion 232 of the shroud 220 is located at a first distance DIS1 away from the first portion 230 as measured along the compressor longitudinal axis B. The second portion 232 may be closer to the aft end 242 of the shroud 220 than to the forward end 240.

The second stage compressor 144 includes a plurality of blades 125 circumferentially encircling the central shaft 210. Each of the plurality of blades 125 extend from the external surface 214 of the central shaft 210 to the radially inward surface 224 of the shroud 220. The blades 125 of the second stage compressor 144 transfer the mechanical energy of the rotating shaft into pneumatic energy in the fluid stream (in the form of dynamic pressure) by compressing and accelerating the airflow in the core airflow path C. The blades 125 may be contoured between the external surface 214 of the central shaft 210 and the radially inward surface 224 of the shroud 220 to appropriately compress and accelerate the airflow in the core airflow path C as required.

The second stage compressor 144 is a monolithic structure rather than being assembled from separate individually formed components that are then assembled. The term monolithic may be defined as an object that is cast or formed as single piece without joints or seams. In other words, the second stage compressor 144 is formed as a single piece comprising a unitary structure. In an embodiment, the second stage compressor 144 has no joints or seams. The second stage compressor 144 may be manufactured or formed via additive manufacturing. Additive manufacturing may include, but is not limited to 3D printing, laser powder bed fusion (L-PBF) additive manufacturing, investment casting (using the rapid prototype method) or any other additive manufacturing technique known to one of skill in the art.

Figure 7:
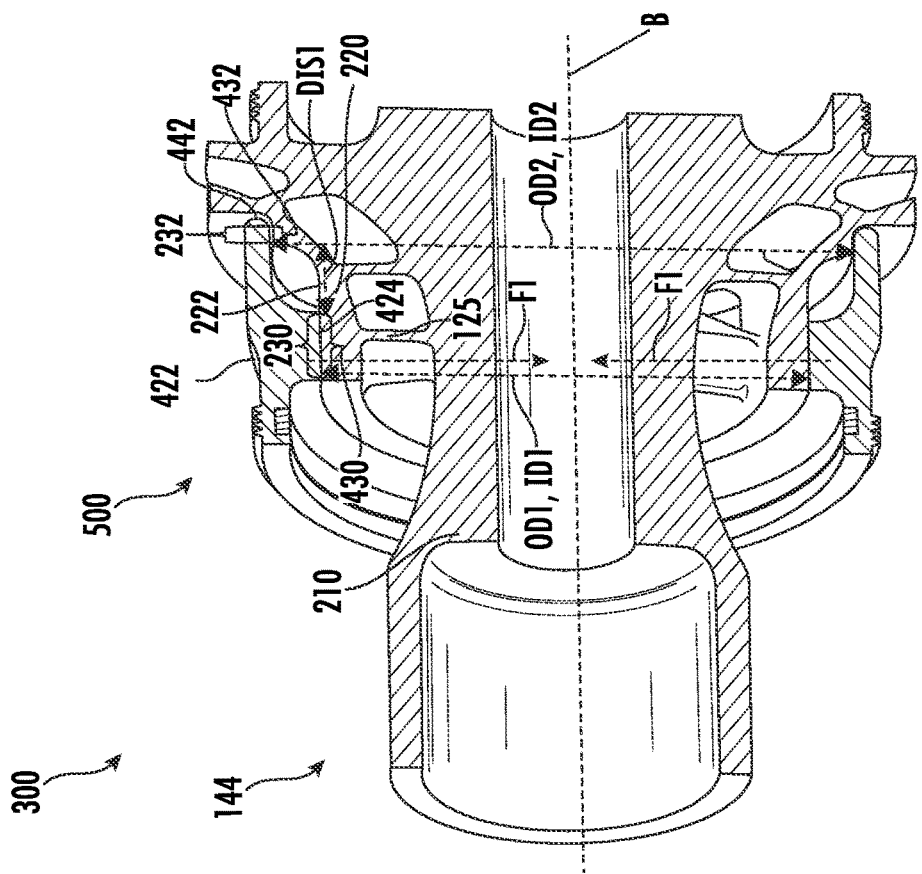
FIG. 7 is an isometric cutaway view of the compressor assembly of the micro-turbine alternator, according to an embodiment of the present disclosure.
Figure 6:
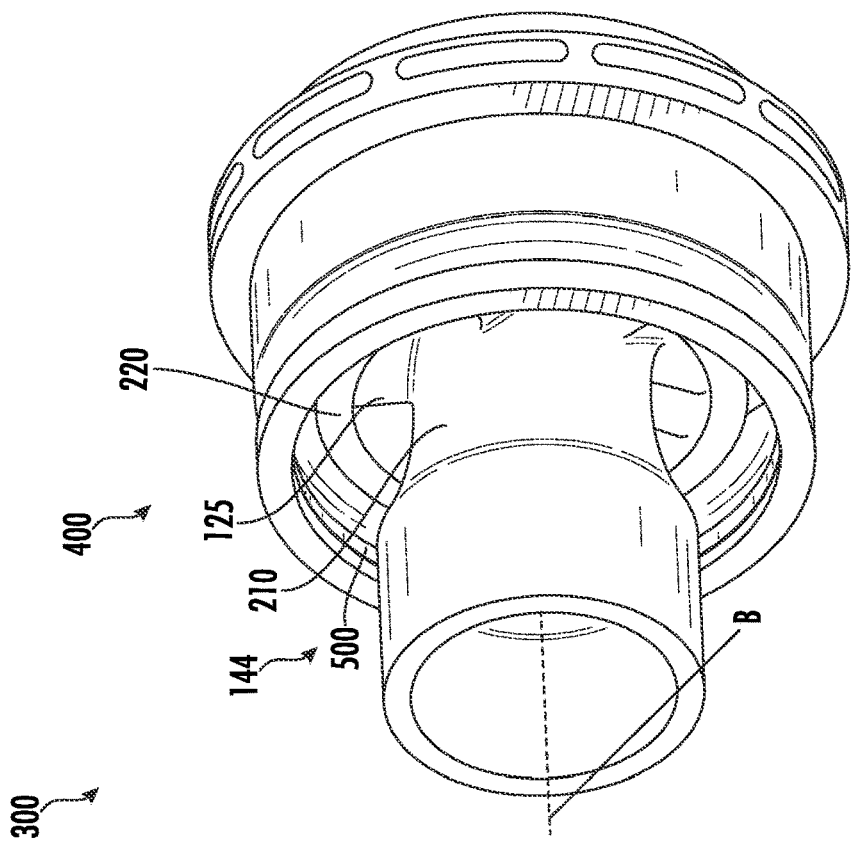
FIG. 6 is an isometric view of a compressor assembly of the micro-turbine alternator, according to an embodiment of the present disclosure.

Referring now to FIGS. 6 and 7, with continued reference to FIGS. 1-5, an isometric view of a compressor assembly 300 is illustrated in FIG. 6 and an isometric cutaway view of the compressor assembly 300 is illustrated in FIG. 7, in accordance with an embodiment of the present disclosure.

The compressor assembly 300 includes the second stage compressor 144 and the compression ring 400 extending circumferentially around the shroud 220 of the second stage compressor 144. It is understood that while FIGS. 6 and 7 and the associated description discuss the embodiments disclosed in relation with the second stage compressor 144, the embodiments disclosed herein are not limited to the second stage compressor 144 and may be applicable to other compressors within the micro-turbine alternator system 100 or any other system where compressors are required.

The compression ring 400 is a stress relieving compressor shroud compression ring and is configured to relieve stress on the second stage compressor 144 during operation by compressing the second stage compressor 144. The compression ring 400 is configured to relieve stress on the second stage compressor 144 by compressing the shroud 220. The compression ring 400 is configured to apply an approximately equal pressure circumferentially around the radially outward surface 222 of the shroud 220 towards central shaft 210 and the compressor longitudinal axis B.

As previously noted, since the second stage compressor 144 is manufactured utilizing additive manufacturing techniques it may have a reduces tensile strength in comparison to a subtractive manufactured impeller. In an embodiment, the second stage compressor 144 may be composed of titanium. The material strength capability or tensile strength for additive manufactured titanium may be about 120 ksi. However, due to the high rotational operating speed of the second stage compressor 144, the second stage compressor 144 may experience a tensile stress of about 150 ksi. Embodiments disclosed herein seek to utilize a compression ring 400 that is installed via an interference fit around the shroud 220 of the second stage compressor 144. The compression ring 400 bridges the gap between the material strength capability of the additively manufactured second stage compressor 144 and the operational tensile stress experienced during operation by compressing the shroud 220 and the blades 125 into the central shaft 210.

The compression ring 400 includes a radially inner surface 424 and a radially outer surface 422 opposite the radially inner surface 424. The radially inner surface 424 of the compression ring 400 is configured to mate flush with one or more portions 230, 232 of the radially outward surface 222 of the shroud 220. The radially inner surface 424 of the compression ring 400 is configured to apply a radially inward compressive force F1 along the one or more portions 230, 232 of the radially outward surface 222 of the shroud 220. The radially inward compressive force F1 is configured to compress the shroud 220 and the blades 125 into the central shaft 210, which helps relieve operational tensile stress on the shroud 220 and the blades 125 when rotating at operational speeds. As shown in FIG. 7, the radially inward compressive force F1 is directed towards the compressor longitudinal axis B.

The compression ring 400 utilizes an interference fit with the shroud 220 to place the shroud 220 in compression when the second stage compressor 144 is at rest. More specifically, the radially inner surface 424 of the compression ring 400 utilizes an interference fit with the radially outward surface 222 of the shroud 220 to place the shroud 220 in compression when the second stage compressor 144 is at rest. The radially inner surface 424 of the compression ring 400 utilizes an interference fit with one or more portions 230, 232 of the radially outward surface 222 of the shroud 220 to place the shroud 220 in compression when the second stage compressor 144 is at rest.

As the rotational speed of the compressor assembly 300 increases, the compression stress from the compression ring 400 decreases, until the micro-turbine alternator system 100 reaches about 50% speed. At this speed, the blades 125 of the second stage compressor 144 may not be subject to any stress. As the speed continues to increase, the blade 125 stress starts to increase in the tensile direction. By full speed, the tensile stress in the blades 125 may be about 50% of the tensile stress that would be present without the compression ring 400 helping to support the mass of the shroud 220.

An inner diameter ID1, ID2 of the radially inner surface 424 of the compression ring 400 may vary in size to mate properly with the first portion 230 and the second portion 232 of the radially outward surface 222 of the shroud 220. The radially inner surface 424 of the compression ring 400 includes a first area 430 and a second area 432.

The second area 432 is located at a first distance DIS1 away from the first area 430 as measured along the compressor longitudinal axis B. The second area 432 may be closer to an aft end 442 of the compression ring 400 than to a forward end 440.

The first area 430 of the radially inner surface 424 of the compression ring 400 is configured to mate flush with the first portion 230 of the radially outward surface 222 of the shroud 220. The second area 432 of the radially inner surface 424 of the compression ring 400 is configured to mate flush with the second portion 232 of the radially outward surface 222 of the shroud 220.

The radially inner surface 424 of the compression ring 400 has a first inner diameter ID1 along the first area 430 of the radially inner surface 424 of the compression ring 400. The radially inner surface 424 of the compression ring 400 has a second inner diameter ID2 along the second area 432 of the radially inner surface 424 of the compression ring 400. The second inner diameter ID2 is greater than the first inner diameter ID2.

In order to accomplish the interference fit, when disassembled, the first inner diameter ID1 of the radially inner surface 424 of the compression ring 400 is less than the first outer diameter OD1 of the radially outward surface 222 of the shroud 220 and the second inner diameter ID2 of the radially inner surface 424 of the compression ring 400 is less than the second outer diameter OD2 of the radially outward surface 222 of the shroud 220. To assemble, the compression ring 400 is expanded by a heat source, the second stage compressor 144 is shrunk by a cold source, and then the compression ring 400 is slid onto the shroud 220. Once assembled and the temperature of compression ring 400 and the second stage compressor 144 reach equilibrium, the first inner diameter ID1 of the radially inner surface 424 of the compression ring 400 is about equal to the first outer diameter OD1 of the radially outward surface 222 of the shroud 220 and the second inner diameter ID2 of the radially inner surface 424 of the compression ring 400 is about equal to the second outer diameter OD2 of the radially outward surface 222 of the shroud 220.

Once the second stage compressor 144 starts to spin, the pre-loaded blades 125 (in compression while at rest) relax as centrifugal force causes the shroud 220 and the compression ring 400 to expand. Advantageously, the compression ring 400 is configured to allow the transfer of the centrifugal load from the shroud 220 to the compression ring 400.

In an embodiment, the compression ring 400 is formed via subtractive machining and thus has an increased tensile strength in comparison to the second stage compressor 144 that was additively manufactured. In an embodiment, the compression ring 400 may be machined from a titanium alloy billet with a tensile strength of about 170 ksi. In another embodiment, the second stage compressor 144 has a first tensile strength and the compression ring 400 has a second tensile strength that is greater than the first tensile strength.

In an embodiment, the second stage compressor 144 may be composed of additive manufactured titanium with a tensile strength of about 120 ksi and the compression ring 400 may be machined from a titanium alloy billet with a tensile strength of about 170 ksi, which would advantageously reduce the maximum tensile stresses experienced in the additively manufactured second stage compressor 144 and shroud 220 to less than 115 ksi during rotational operation.

Referring now to FIGS. 8 and 9, with continued reference to FIGS. 1-7, an enlarged isometric view of the drive line assembly 500 is illustrated in FIG. 8 and an enlarged isometric cut-away view of the drive line assembly 500 is illustrated in FIG. 9, in accordance with an embodiment of the present disclosure. The drive line assembly 500 includes at least the first stage compressor 142, the second stage compressor 144, the third stage compressor 146, the first stage turbine 152, the second stage turbine 154, the coupling assembly 170, the compressor transfer tube 149, the compressor shaft 148, and the turbine shaft 158.

In an embodiment, the first stage compressor 142 and the compressor shaft 148 are formed together as a monolithic structure rather than being assembled from separate individually formed components that are then assembled. The term monolithic may be defined as an object that is cast or formed as single piece without joints or seams. In other words, the first stage compressor 142 and the compressor shaft 148 are formed together as a single piece comprising a unitary structure. In an embodiment, the first stage compressor 142 and the compressor shaft 148 have no joints or seams. The first stage compressor 142 and the compressor shaft 148 may be manufactured or formed via additive manufacturing. Additive manufacturing may include, but is not limited to 3D printing, laser powder bed fusion (L-PBF) additive manufacturing, investment casting (using the rapid prototype method) or any other additive manufacturing technique known to one of skill in the art.

In an embodiment, the first stage turbine 152, the second stage turbine 154, and the turbine shaft 158 are formed together as a monolithic structure rather than being assembled from separate individually formed components that are then assembled. The term monolithic may be defined as an object that is cast or formed as single piece without joints or seams. In other words, the first stage turbine 152, the second stage turbine 154, and the turbine shaft 158 are formed together as a single piece comprising a unitary structure. In an embodiment, the first stage turbine 152, the second stage turbine 154, and the turbine shaft 158 have no joints or seams. The first stage turbine 152, the second stage turbine 154, and the turbine shaft 158 may be manufactured or formed via additive manufacturing. Additive manufacturing may include, but is not limited to 3D printing, laser powder bed fusion (L-PBF) additive manufacturing, investment casting (using the rapid prototype method) or any other additive manufacturing technique known to one of skill in the art.

The coupling assembly 170 is configured to operably connect the turbine shaft 158 to the compressor shaft 148 via a magnetic coupling force. The coupling assembly 170 is composed of a generator coupler 710, a turbine coupler 750, and a spherical bearing 790. The spherical bearing 790 is spherical in shape. The spherical bearing 790 may be composed of a ceramic material, stainless steel, steel, or any similar material known to one of skill in the art.

In an embodiment, the second stage compressor 144 and the turbine coupler 750 are formed together as a monolithic structure rather than being assembled from separate individually formed components that are then assembled. The term monolithic may be defined as an object that is cast or formed as single piece without joints or seams. In other words, the second stage compressor 144 and the turbine coupler 750 are formed together as a single piece comprising a unitary structure. In an embodiment, the second stage compressor 144 and the turbine coupler 750 have no joints or seams. The second stage compressor 144 and the turbine coupler 750 may be manufactured or formed via additive manufacturing. Additive manufacturing may include, but is not limited to 3D printing, laser powder bed fusion (L-PBF) additive manufacturing, investment casting (using the rapid prototype method) or any other additive manufacturing technique known to one of skill in the art.

The generator coupler 710 includes a first generator coupler end 712 and a second generator coupler end 714 located opposite the first generator coupler end 712. The generator coupler 710 includes an inner generator coupler surface 716 and an outer generator coupler surface 718 located opposite the inner generator coupler surface 716. The inner generator coupler surface 716 extends from the first generator coupler end 712 to the second generator coupler end 714 and the outer generator coupler surface 718 extends from the first generator coupler end 712 to the second generator coupler end 714. A generator coupling disc 720 is located at the second generator coupler end 714. The generator coupling disc 720 may include a generator facing surface 722 and a turbine coupler facing surface 724 located opposite the generator facing surface 722. The turbine coupler facing surface 724 is located at the second generator coupler end 714. The generator coupling disc 720 includes a first plurality of magnets 726. The first plurality of magnets 726 may be embedded in the generator coupling disc 720 or attached to the generator coupling disc 720. More specifically, the first plurality of magnets 726 may be embedded in the turbine coupler facing surface 724 or attached to the turbine coupler facing surface 724. The first plurality of magnets 726 may be arranged or arrayed in a ring shape around the turbine coupler facing surface 724 and/or the central longitudinal axis A. The first plurality of magnets 726 may have a first magnetic polarity.

The generator coupler 710 includes a generator coupler passage 730 formed therein. The inner generator coupler surface 716 defines the generator coupler passage 730. The generator coupler passage 730 extends from the first generator coupler end 712 to the second generator coupler end 714.

The generator coupler passage 730 may have a conical opening 732 at the second generator coupler end 714, as illustrated in FIG. 9. The first conical opening 732 may be operably shaped to cradle a first portion of the spherical bearing 790 in the first conical opening 732. In alternate embodiments, the generator coupler passage 730 may have a first spherical opening at the second generator coupler end 714. The first spherical opening may be configured to cradle the first portion of the spherical bearing 790.

The inner generator coupler surface 716 may have three different inner diameter ID3, ID4, ID5. The inner generator coupler surface 716 may have a first inner diameter ID3 at the second generator coupler end 714. The first conical opening 732 is located at the second generator coupler end 714 and extending to a first conical base 734 located a first distance DL1 away from the second generator coupler end 714. The inner generator coupler surface 716 may have a second inner diameter ID4 at the first conical base 734. The second inner diameter ID4 is less than the first inner diameter ID3. In an embodiment, the inner diameter of the inner generator coupler surface 716 decreases linearly from the first inner diameter ID3 to the second inner diameter ID4. In an alternate embodiment, the inner diameter of the inner generator coupler surface 716 decreases exponentially from the first inner diameter ID3 to the second inner diameter ID4. The inner generator coupler surface 716 has the second inner diameter ID4 from the first conical base 734 to a generator coupler seat 738. The generator coupler seat 738 being located between the first conical base 734 and the first generator coupler end 712.

At the generator coupler seat 738, the inner diameter of the inner generator coupler surface 716 is reduced from the second inner diameter ID4 to a third inner diameter ID5. The third inner diameter ID5 is less than the second inner diameter ID4. The reduction of the inner diameter of the inner generator coupler surface 716 from the second inner diameter ID4 to a third inner diameter ID5 creates the generator coupler seat 738 at the generator coupler seat 738. The inner generator coupler surface 716 at the generator coupler seat 738 is about perpendicular to the inner generator coupler surface 716 from the first conical base 734 to the generator coupler seat 738. Further, the inner generator coupler surface 716 at the generator coupler seat 738 is about perpendicular to the inner generator coupler surface 716 from the generator coupler seat 738 to the first generator coupler end 712. The perpendicular orientation of the inner generator coupler surface 716 at the generator coupler seat 738 creates an attachment point for the compressor shaft 148 to secure to the generator coupler 710, as discussed further herein. The inner generator coupler surface 716 has the third inner diameter ID5 from the generator coupler seat 738 to the first generator coupler end 712. The generator coupler seat 738 is located a second distance DL2 away from the first conical base 734. The generator coupler seat 738 is located a third distance DL3 away from the first generator coupler end 712.

As aforementioned, the compressor shaft 148 is configured to secure to the generator coupler 710. The compressor shaft 148 may be removably secured to the generator coupler 710. In an embodiment, the compressor shaft 148 may be a tie bolt, and a first nut 744 and a first washer 742 may be used to secure the compressor shaft 148 to the generator coupler 710. The first nut 744 is configured to thread onto and secure to the compressor shaft 148 within the generator coupler passage 730. The first washer 742 is interposed between the first nut 744 and the generator coupler seat 738. The generator coupler 710 is secured to the compressor shaft 148 via the first nut 744 and the generator coupler seat 738.

The turbine coupler 750 includes a first turbine coupler end 752 and a second turbine coupler end 754 located opposite the first turbine coupler end 752. The turbine coupler 750 includes an inner turbine coupler surface 756 and an outer turbine coupler surface 758 located opposite the inner turbine coupler surface 756. The inner turbine coupler surface 756 extends from the first turbine coupler end 752 to the second turbine coupler end 754 and the outer turbine coupler surface 758 extends from the first turbine coupler end 752 to the second turbine coupler end 754. A turbine coupling disc 760 is located at the second turbine coupler end 754. The turbine coupling disc 760 may include a turbine facing surface 762 and a generator coupler facing surface 764 located opposite the turbine facing surface 762. The generator coupler facing surface 764 is located at the second turbine coupler end 754. The turbine coupling disc 760 includes a second plurality of magnets 766. The second plurality of magnets 766 may be embedded in the turbine coupling disc 760 or attached to the turbine coupling disc 760. More specifically, the second plurality of magnets 766 may be embedded in the generator coupler facing surface 764 or attached to the generator coupler facing surface 764. The second plurality of magnets 766 may be arranged or arrayed in a ring shape around the generator coupler facing surface 764 and/or the central longitudinal axis A. The second plurality of magnets 766 may have a second magnetic polarity. The second magnetic polarity may be opposite the first magnetic polarity of the first plurality of magnets 726. Advantageously, since the first plurality of magnets 726 and the second plurality of magnets 766 have opposite polarities the turbine coupler 750, the generator coupler 710 will be pulled together to compete the drive line assembly 500 via a magnetic coupling force.

In another embodiment, all of the first plurality of magnets 726 may not have the same polarity but may be oriented in a ring of magnets with alternating polarities. In other words, the first plurality of magnets 726 have a first group of magnets with a first polarity (e.g., north) and a second group of magnets with a second polarity (e.g., south), and the first plurality of magnets 726 may be arranged or arrayed in an alternating polarity ring shape around the generator coupler facing surface 764 and/or the central longitudinal axis A, such that no two magnets of the same polarity are circumferentially adjacent to each other. In this same embodiment, the second plurality of magnets 726 are replaced by a first plurality of raised metallic structures (e.g., castellations) that are configured to align with each of the first plurality of magnets 726. The first plurality of raised metallic structures are configured to accept the magnetic flux from a north magnet of the first plurality of magnets 726, pass the magnetic flux through the turbine coupling 750, and back to the neighboring south magnet of the first plurality of magnets 726 back on the generator coupling 710.

This magnetic coupling force between the first plurality of magnets 726 and the second plurality of magnets 766 provides an axial clamping force that pulls the turbine coupler 750 toward the generator coupler 710. The spherical bearing 790 is clamped between the generator coupler 710 and the turbine coupler 750 by the magnetic coupling force. The spherical bearing 790 provides radial support to the second turbine coupler end 754 of the turbine coupler 750, when the magnetic coupling force clamps the spherical bearing 790 between the turbine coupler 750 and the generator coupler 710.

The turbine coupler 750 includes a turbine coupler passage 770 formed therein. The inner turbine coupler surface 756 defines the turbine coupler passage 770. The turbine coupler passage 770 extends from the first turbine coupler end 752 to the second turbine coupler end 754. It is understood that, if the turbine coupler 750 and the second stage compressor 144 are formed from a single piece comprising a unitary structure or integrally connected, then the turbine coupler passage 770 of FIG. 9 is equivalent to the passageway 212 of FIG. 5 and the inner turbine coupler surface 756 is equivalent to internal surface 216 of FIG. 5.

The turbine coupler passage 770 may have a second conical opening 772 at the second turbine coupler end 754, as illustrated in FIG. 9. The second conical opening 772 may be operably shaped to cradle a second portion of the spherical bearing 790 in the second conical opening 772. In alternate embodiment, the turbine coupler passage 770 may have a second spherical opening at the second turbine coupler end 754. The second spherical opening being configured to cradle the second portion of the spherical bearing 790.

A spherical shaped pocket to cradle the spherical bearing 790 would be defined by a first spherical opening and a second spherical opening opposite the first spherical opening, whereas a conical shaped pocket to cradle the spherical bearing 790 would be defined by the first conical opening 732 and the second conical opening 772 opposite the first conical opening 732. A spherical shaped pocket would cradle the spherical ball exactly, while a conical shaped pocket for the spherical bearing 790 may cause a larger or smaller axial separation between the generator coupler 710 and the turbine coupler 710, based on the size of the spherical bearing 790 being used. Thus, advantageously, a conical shaped pocket would allow the axial separation between the generator coupler 710 and the turbine coupler 710 to be adjustable based on the size of the spherical bearing 790 being used. A larger ball would drive the first conical opening 732 and the second conical opening 772 further apart, while still aligning the two halves in the radial direction. Whereas, a smaller ball would move the first conical opening 732 and the second conical opening 772 closer together, while still aligning the two halves in the radial direction.

The inner turbine coupler surface 756 may have three different inner diameter ID6, ID7, ID8. The inner turbine coupler surface 756 may have a fourth inner diameter ID6 at the second turbine coupler end 754. The second conical opening 772 extends into the turbine coupler 750 a first distance to a second conical base 774. The second conical opening 772 is located at the second turbine coupler end 754 and extending to a second conical base 774 located a fourth distance DL4 away from the second turbine coupler end 754. The inner turbine coupler surface 756 may have a fifth inner diameter ID7 at the second conical base 774. The fifth inner diameter ID7 is less than the fourth inner diameter ID6. In an embodiment, the inner diameter of the inner turbine coupler surface 756 decreases linearly from the fourth inner diameter ID6 to the fifth inner diameter ID7. In an alternate embodiment, the inner diameter of the inner turbine coupler surface 756 decreases exponentially from the fourth inner diameter ID6 to the fifth inner diameter ID7. The inner turbine coupler surface 756 has the fifth inner diameter ID7 from the second conical base 774 to a turbine coupler seat 778. The turbine coupler seat 778 being located between the second conical base 774 and the first turbine coupler end 752.

At the turbine coupler seat 778, the inner diameter of the inner turbine coupler surface 756 is reduced from the fifth inner diameter ID7 to a sixth inner diameter ID8. The sixth inner diameter ID8 is less than the fifth inner diameter ID7. The reduction of the inner diameter of the inner turbine coupler surface 756 from the fifth inner diameter ID7 to a sixth inner diameter ID8 creates the turbine coupler seat 778 at the turbine coupler seat 778. The inner turbine coupler surface 756 at the turbine coupler seat 778 is about perpendicular to the inner turbine coupler surface 756 from the second conical base 774 to the turbine coupler seat 778. Further, the inner turbine coupler surface 756 at the turbine coupler seat 778 is about perpendicular to the inner turbine coupler surface 756 from the turbine coupler seat 778 to the first turbine coupler end 752. The perpendicular orientation of the inner turbine coupler surface 756 at the turbine coupler seat 778 creates an attachment point for the turbine shaft 158 to secure to the turbine coupler 750, as discussed further herein. The inner turbine coupler surface 756 has the sixth inner diameter ID8 from the turbine coupler seat 778 to the first turbine coupler end 752. The turbine coupler seat 778 is located a fifth distance DL5 away from the second conical base 774. The turbine coupler seat 778 is located a sixth distance DL6 away from the first turbine coupler end 752.

As aforementioned, the turbine shaft 158 is configured to secure to the turbine coupler 750. The turbine shaft 158 may be removably secured to the turbine coupler 750. In an embodiment, the turbine shaft 158 may be a tie bolt, and a second nut 784 and a second washer 782 may be used to secure the turbine shaft 158 to the turbine coupler 750. The second nut 784 is configured to thread onto and secure to the turbine shaft 158 within the turbine coupler passage 770. The second washer 782 is interposed between the second nut 784 and the turbine coupler seat 778. The turbine coupler 750 is secured to the turbine shaft 158 via the second nut 784 and the turbine coupler seat 778.

Figure 10:
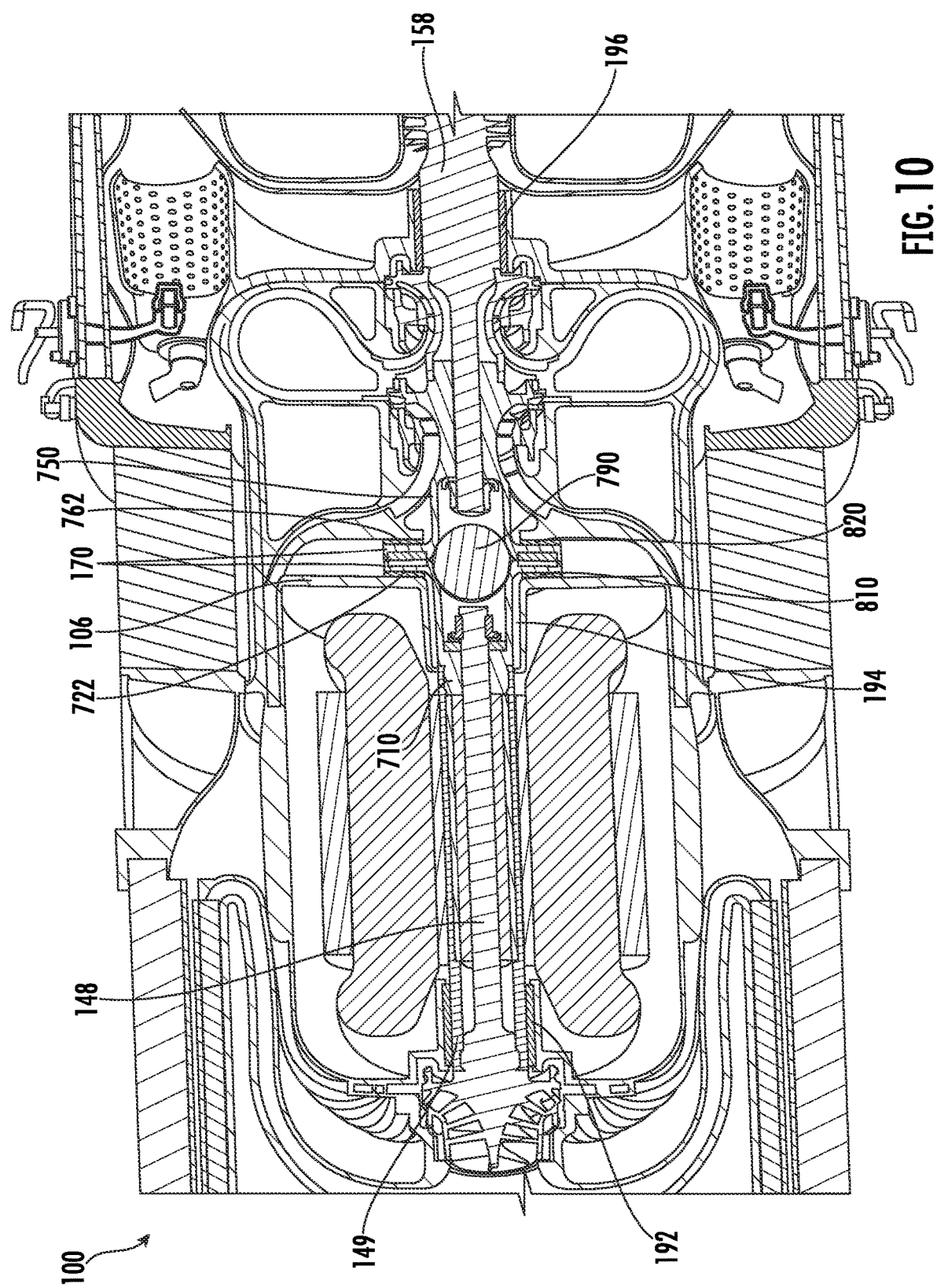
FIG. 10 is an enlarged isometric view of the micro-turbine alternator system, according to an embodiment of the present disclosure.

Referring now to FIG. 10, with continued reference to FIGS. 1-8, an isometric cut-away view of the micro-turbine alternator system 100 is illustrated, in accordance with one or more embodiments of the present disclosure.

As aforementioned, the bearing system includes a first journal bearing 192 located between the compressor transfer tube 149 and the frame 106 of the micro-turbine alternator system 100. The bearing system includes a second journal bearing 194 located between the generator coupler 710 of the coupling assembly 170 and the frame 106 of the micro-turbine alternator system 100. The bearing system includes a third journal bearing 196 located between the turbine shaft 158 and the frame 106 of the micro-turbine alternator system 100.

Advantageously, magnetically coupling the turbine coupler 750 to the generator coupler 710 eliminates the need for a fourth journal bearing that would typically help directly support the turbine shaft 158. Typically, rotating shafts requires two journal bearings proximate each end of the rotating shaft for rotational stability of the rotating shaft. The compressor shaft 148 exemplifies this by being directly supported by the first journal bearing 192 and the second journal bearing 194, whereas the turbine shaft 158 is only directly supported by the third journal bearing 196. However, the turbine shaft 158 is indirectly supported by the second journal bearing 194 as the load is transferred from the turbine shafts 158 through the turbine coupler 750 then through the spherical bearing 790, and then through the generator coupler 710 to the second journal bearing 194. Advantageously, this configuration eliminates the need for a second journal bearing specifically for the turbine shaft 158 and a fourth journal bearing overall, which to reduce the bearing drag on the turbine shaft 158 by 50%, which increases the efficiency of the micro-turbine alternator system 100. The turbine shaft 158 arrangement would be very unstable without a second radial support on the turbine shaft 158 but with this configuration the second radial support is provided by the spherical bearing 790, which is clamped between the first conical opening 732 and the second conical opening 772, by the magnetic coupling.

The micro-turbine alternator system 100 further includes a first thrust bearing 810 and a second thrust bearing 820. The first thrust bearing 810 is located between the frame 106 and the generator facing surface 722 of the generator coupling disc 720. The second thrust bearing 810 is located between the frame 106 and the turbine facing surface 762 of the turbine coupling disc 760.

The spherical bearing 790 is sized to provide the correct thrust bearing pre-load, without requiring any additional shims. If the thrust bearings 810, 820 needs additional pre-load, a larger spherical bearing 790 may be used, which pushes the generator coupler 710 and the turbine coupler 750 further apart and provides additional pre-load to the thrust bearings 810, 820. If the thrust bearings 810, 820 are too highly pre-loaded, a smaller spherical bearing 790 may be used, allowing the generator coupler 710 and the turbine coupler 750 to move closer together, reducing the preload on the thrust bearings 810, 820.

Also advantageously, spherical bearing 790 in combination with the magnetic coupling provides an extremely efficient thermal barrier between the relatively hot turbine shaft 158 and the relatively cool compressor shaft 148. It is important to provide this thermal barrier to ensure that the permanent magnets 136 of electric generator 130 do not become overheated, which could cause demagnetization.

Technical effects and benefits of the features described herein include coupling a drive shaft for a turbine to a drive shaft of a compressor via magnetic coupling assembly of two magnetized shafts and radially supporting the coupling of the two magnetized shafts through a spherical bearing.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An electrical power generation system, comprising:
    a micro-turbine alternator, comprising:
        a combustion chamber;
        at least one turbine driven by combustion gases from the combustion chamber;
        a first stage compressor;
        a second stage compressor located aft of the first stage compressor, the first stage compressor and the second stage compressor being operably connected to the combustion chamber to provide a compressed airflow thereto;
one or more shafts connecting the at least one turbine to the first stage compressor and the second stage compressor such that rotation of the at least one turbine drives rotation of the first stage compressor and second stage compressor,
wherein the one or more shafts comprise:
a turbine shaft attached to the at least one turbine;
a compressor shaft attached to the first stage compressor; and
a coupling assembly configured to operably connect the turbine shaft to the compressor shaft via a magnetic coupling force; and
a generator coupler secured to the compressor shaft, the generator coupler comprises a first plurality of magnets having a first magnetic polarity; and
a turbine coupler secured to the turbine shaft, the turbine coupler comprises a second plurality of magnets having a second magnetic polarity opposite the first magnetic polarity,
wherein the magnetic coupling force between the first plurality of magnets and the second plurality of magnets provides an axial clamping force that pulls the turbine coupler toward the generator coupler.

2. The electrical power generation system of claim 1, wherein the coupling assembly further comprises:
a spherical bearing located between the generator coupler and the turbine coupler.

3. The electrical power generation system of claim 2, wherein the generator coupler further comprises a first conical opening configured to cradle a first portion of the spherical bearing, and wherein the turbine coupler further comprises a second conical opening configured to cradle a second portion of the spherical bearing.

4. The electrical power generation system of claim 2, wherein the generator coupler further comprises a first spherical opening configured to cradle a first portion of the spherical bearing, and wherein the turbine coupler comprises a second spherical opening configured to cradle a second portion of the spherical bearing.

5. The electrical power generation system of claim 2, wherein the generator coupler further comprises:
a first generator coupler end;
a second generator coupler end located opposite the first generator coupler end; and
a generator coupler passage extending from the first generator coupler end to the second generator coupler end.

6. The electrical power generation system of claim 5, wherein the generator coupler further comprises:
an inner generator coupler surface defining the generator coupler passage, wherein the inner generator coupler surface comprises:
a first conical opening located at the second generator coupler end and extending to a first conical base located a first distance away from the second generator coupler end, the first conical opening configured to cradle a first portion of the spherical bearing; and
a generator coupler seat located between the first conical base and the first generator coupler end,
wherein the inner generator coupler surface at the generator coupler seat is about perpendicular to the inner generator coupler surface from the generator coupler seat to the first generator coupler end.

7. The electrical power generation system of claim 6, wherein the generator coupler further comprises:
a first nut threaded onto and secured to the compressor shaft within the generator coupler passage; and
a first washer interposed between the first nut and the generator coupler seat,
wherein the generator coupler is secured to the compressor shaft via the first nut and the generator coupler seat.

8. The electrical power generation system of claim 5, wherein the generator coupler further comprises:
a generator coupling disc located at the second generator coupler end, the generator coupling disc comprises:
a generator facing surface; and
a turbine coupler facing surface located opposite the generator facing surface,
wherein the first plurality of magnets are attached to or embedded in the generator coupling disc.

9. The electrical power generation system of claim 8, wherein the first plurality of magnets are attached to or embedded in the turbine coupler facing surface.

10. The electrical power generation system of claim 9, wherein the first plurality of magnets are arrayed in a ring shape around at least one of the turbine coupler facing surface or a central longitudinal axis A of the electrical power generation system.

11. The electrical power generation system of claim 2, wherein the turbine coupler further comprises:
a first turbine coupler end;
a second turbine coupler end located opposite the first turbine coupler end; and
a turbine coupler passage extending from the first turbine coupler end to the second turbine coupler end.

12. The electrical power generation system of claim 11, wherein the turbine coupler further comprises:
an inner turbine coupler surface defining the turbine coupler passage, wherein the inner turbine coupler surface comprises:
a second conical opening located at the second turbine coupler end and extending to a second conical base located a first distance away from the second turbine coupler end, the second conical opening configured to cradle a second portion of the spherical bearing; and
a turbine coupler seat located between the second conical base and the first turbine coupler end,
wherein the inner turbine coupler surface at the turbine coupler seat is about perpendicular to the inner turbine coupler surface from the turbine coupler seat to the first turbine coupler end.

13. The electrical power generation system of claim 12, wherein the turbine coupler further comprises:
a second nut threaded onto and secured to the turbine shaft within the turbine coupler passage; and
a second washer interposed between the second nut and the turbine coupler seat,
wherein the turbine coupler is secured to the turbine shaft via the second nut and the turbine coupler seat.

14. The electrical power generation system of claim 11, wherein the turbine coupler further comprises:
a turbine coupling disc located at the second turbine coupler end, the turbine coupling disc comprises:
a turbine facing surface; and
a generator coupler facing surface located opposite the turbine facing surface,
wherein the second plurality of magnets are attached to or embedded in the turbine coupling disc.

15. The electrical power generation system of claim 14, wherein the second plurality of magnets are attached to or embedded in the generator coupler facing surface.

16. The electrical power generation system of claim 15, wherein the second plurality of magnets are arrayed in a ring shape around at least one of the generator coupler facing surface or a central longitudinal axis A of the electrical power generation system.

17. The electrical power generation system of claim 1, further comprising:
   an electric generator disposed along the one or more shafts such that electrical power is generated via rotation of the one or more shafts, wherein the electric generator is disposed along the one or more shafts between the first stage compressor and the second stage compressor.

18. The electrical power generation system of claim 17, wherein at least one of the one or more shafts passes through the electric generator.

\* \* \* \* \*